United States Patent
Moeller

(10) Patent No.: US 6,456,408 B1
(45) Date of Patent: Sep. 24, 2002

(54) METHOD AND APPARATUS FOR CONTROLLING THE OPTICAL POWER OF A OPTICAL TRANSMISSION SIGNAL

(75) Inventor: Lothar Benedict Erhard Josef Moeller, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/273,949

(22) Filed: Mar. 22, 1999

(30) Foreign Application Priority Data

Mar. 26, 1998 (EP) ............................................. 98302312

(51) Int. Cl.[7] .......................... H04J 14/02; H04B 10/00; H04B 10/04
(52) U.S. Cl. ......................... 359/124; 359/161; 359/181
(58) Field of Search .................................. 359/110, 161, 359/186, 187, 121; 375/238, 296, 297

(56) References Cited

U.S. PATENT DOCUMENTS

| | | | |
|---|---|---|---|
| 5,155,617 A | * 10/1992 | Solgaard et al. ............. | 359/245 |
| 5,491,548 A | * 2/1996 | Bell et al. .................... | 356/73.1 |
| 5,600,479 A | * 2/1997 | Evans .......................... | 359/237 |
| 5,907,420 A | * 5/1999 | Chraplyvy et al. .......... | 359/179 |
| 6,107,850 A | * 8/2000 | Shimizu ....................... | 327/172 |
| 6,271,945 B1 | * 8/2001 | Terahara et al. ............. | 359/124 |
| 6,275,313 B1 | * 8/2001 | Denkin et al. ............... | 359/124 |

FOREIGN PATENT DOCUMENTS

| | | | |
|---|---|---|---|
| EP | 96119965.0 | 12/1996 | ............ H04J/14/02 |
| EP | 97306774.7 | 9/1997 | ............ H04J/14/02 |
| JP | 04281362 | 10/1992 | ........... H04B/10/04 |
| JP | 08061231 | 3/1996 | ............ H04J/14/00 |

OTHER PUBLICATIONS

European Search Report dated Aug. 26, 1998.

* cited by examiner

*Primary Examiner*—Leslie Pascal
*Assistant Examiner*—Dalzid Singh
(74) *Attorney, Agent, or Firm*—Michael A. Morra; Ozer M. N. Teitelbaum

(57) ABSTRACT

The present invention generally relates to the field of optical transmission and particularly to a method and an apparatus for controlling the optical power of an optical transmission signal in wavelength division multiplex optical transmission system (WDM system). It is known to add one additional channel to the optical transmission signal of WDM systems, for controlling the power of the optical transmission signal. The optical power of the control channel is controlled to keep the total optical power of the optical transmission signal constant, e.g., if a channel of the optical transmission signal fails, the optical power of the control channel is increased. To change the optical power of the control channel usually the injection current of a laser which generates the control channel is changed as the laser is operated in the continuous wave mode. This causes the disadvantage of cross talk which influences the optical transmission signal. The present invention avoids this disadvantage by adding an optical control signal having a fixed optical peak power level. The necessary variations of the average optical power of the control signal are effected by adjusting the period and/or the pulse width of the optical control signal. The mean optical power of the optical control signal resulting from the fixed optical power level, the period and the pulse width is compensating the variations in the optical power of the optical transmission signal.

13 Claims, 2 Drawing Sheets

METHOD AND APPARATUS FOR CONTROLLING THE OPTICAL POWER OF A OPTICAL TRANSMISSION SIGNAL

CROSS-REFERENCE TO RELATED APPLICATION

This application claims priority of European Patent Application No. 98302312.8, which was filed on Mar. 26, 1998.

TECHNICAL FIELD

The present invention generally relates to the field of optical transmission and particularly to a method and an apparatus for controlling the optical power of an optical transmission signal in a wavelength division multiplex optical transmission system.

BACKGROUND OF THE INVENTION

Wavelength division multiplexing (WDM) is being introduced as a means of increasing the capacity of optical fibre transmission systems. In a WDM system each individual fibre carries a number of optical signals having different wavelengths. When these optical signals are transmitted over long distances, periodic regeneration of the optical signals is necessary. Currently, this regeneration is effected either by demultiplexing the different wavelengths and then converting the optical signals to corresponding electrical signals which are regenerated and then reconverted to optical signals or by using optical amplifiers, e.g. Erbium Doped Fibre Amplifiers (EDFA). Optical amplifiers have the advantage of both relatively low cost and the ability to amplify all used wavelengths without the need for demultiplexing and opto-electronic regeneration. WDM systems currently under development will have thirty or more channels, i. e. modulated optical signals with different wavelengths (known as Dense Wavelength Division Multiplexing, DWDM).

However, if EDFAs are used for regeneration of the optical transmission signal, a problem arises if one or more channels of the optical transmission signal fail or are added to or dropped from the optical transmission signal as EDFAs are sensitive to variations of the input power. In these cases cross saturation in EDFAs will induce power transients in the surviving channels. The surviving channels will suffer error bursts if, for example, their powers exceed thresholds for optical nonlinearities or become too low to preserve adequate eye opening.

From "FAST LINK CONTROL PROTECTION FOR SURVIVING CHANNELS IN MULTIWAVELENGTH OPTICAL NETWORKS", by J. L. Zyskind et al, $22^{nd}$ European Conference on Optical Communication—ECOC'96, Oslo, pages 49–52, it is known to add one additional channel to the optical transmission signal, for controlling the power of the optical transmission signal. The optical power of the control channel is controlled to keep the total optical power of the optical transmission signal constant, e.g., if a channel of the optical transmission signal fails, the optical power of the control channel is increased to keep the total optical power of the optical transmission signal constant. To change the optical power of the control channel usually the injection current of a laser which generates the control channel is changed as the laser is operated in the continuous wave mode.

The known control of the optical power for an optical transmission signal has the disadvantage of cross talk caused by the control channel. The change of the injection current of the laser causes, besides the wanted change of the optical power, an unwanted change in the spectrum of the light emitted by the laser. If big changes of the optical power have to be compensated, the frequency of the emitted light may be shifted several GHz. This causes problems especially with DWDM systems which are very sensitive to frequency changes of the present channels as only small frequency distances are used between the channels of the DWDM systems. Therefore tolerances of typically ±1 GHz deviation of the nominal frequency of present channels are allowed.

SUMMARY OF THE INVENTION

Accordingly, it is an object of the present invention to provide a method and an apparatus for controlling the optical power of an optical transmission signal in wavelength division multiplex optical transmission. It is one aim of the inventive method and the apparatus under consideration to avoid the drawbacks known from the state of the art.

According to a first object of the invention there is provided a method for controlling the optical power of an optical transmission signal in a wavelength division multiplex system, comprising adding an optical control signal having a variable optical power to compensate for variations in the optical power of the optical transmission signal, characterised in that the optical control signal has a fixed optical power level, an adjustable period and/or an adjustable pulse width, and further characterised in that said period and/or said pulse width of the optical control signal are adjusted in to compensate for variations in the optical power of the optical transmission signal.

According to a second object of the invention there is provided an apparatus for controlling the optical power of an optical transmission signal (OS;OS') in a wavelength division multiplex system, having a light source means ($\lambda_x$; $\lambda'_x$) for generating an optical control signal (C;C') having a variable optical power, a control means (2,3;8,3') for detecting variations in the optical power of the optical transmission signal (OS;OS') and controlling in response the optical power of the light source means ($\lambda_x;\lambda'_x$), and an adding means (1;7) for adding the optical control signal (C;C') to the optical transmission signal (OS;OS'), characterised in that the light source means ($\lambda_x;\lambda'_x$) generates the optical control signal (C;C') having a fixed optical power level, an adjustable period and/or an adjustable pulse width, and further characterised in that the control means (3;3') adjusts said period and/or said pulse width of the optical control signal (C;C') ) in response to the detected variations.

An advantage of the present invention is that it allows the optical power of an optical transmission signal to be kept at a constant level by means of an optical control signal added to the optical transmission signal, without impairing the optical transmission signal. The present invention will become more fully understood from the detailed description given hereinafter and further scope of applicability of the present invention will become apparent. However, it should be understood that the detailed description is given by way of illustration only, since various changes and modifications within the spirit and scope of the invention will become apparent to those skilled in the art.

BRIEF DESCRIPTION OF THE DRAWINGS

The following detailed description is accompanied by drawings of which

Identical denotations in different Figures represent identical elements. Bold lines coupling depicted elements in the figures represent optical couplings, e.g. optical fibres, other couplings are electrical couplings.

DETAILED DESCRIPTION

Figure 1:
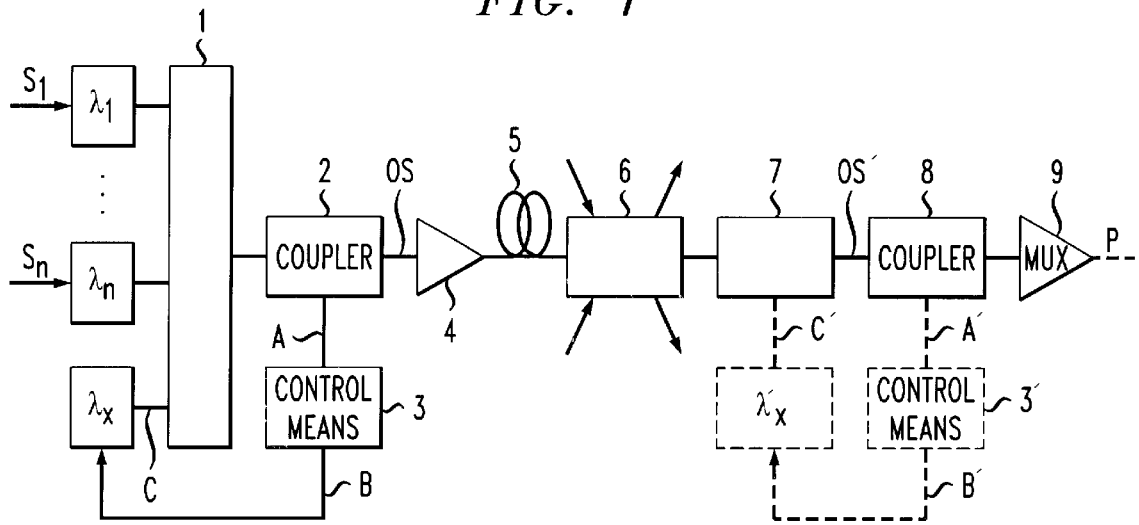
FIG. 1 is a schematic representation of an embodiment of an apparatus for controlling the optical power in a wavelength division multiplex system according to this invention.

Depicted in FIG. 1 is a wavelength division multiplex system having an apparatus for controlling the optical power of an optical transmission signal of the system. The WDM system comprises light sources $\lambda_1 \ldots \lambda_n$, e.g. lasers, at different wavelength, which are modulated with signals $S_1 \ldots S_n$ to form different optical channels. The different optical channels are combined with a wavelength division multiplexer 1 to form an optical transmission signal OS. The WDM system further comprises an optical amplifier 4, e.g. an EDFA, which amplifies the optical transmission signal OS for the transmission over a transmission path 5, e.g. an optical fibre. Integrated into the WDM system is an apparatus for controlling the optical power of the transmission signal OS, comprising a coupler 2, a control means 3 and a light source $\lambda_x$, e.g. a laser, which emits a light at a wavelength different from the wavelength used for the optical channels of the WDM system. The coupler 2 couples out a small amount of the energy of the optical transmission signal OS which has to be controlled and kept at a constant energy level. The coupler 2 is coupled, e.g. with an optical fibre A, to the control means 3. The control means 3 detects variations in the optical power of the optical transmission signal OS and controls the light source $\lambda_x$ in response to the detected variations, e.g. via an electrical coupling B with light source $\lambda_x$, in a way that the optical power of the light source $\lambda_x$ compensates for the detected variations in the optical power of the optical transmission signal OS. An output C of the light source $\lambda_x$ is coupled, e.g. with an optical fibre, to the wavelength division multiplexer 1 to add the optical control signal of the light source $\lambda_x$ to the optical transmission signal.

The general background of the present invention is, that the optical control signal at output C generated by the light source $\lambda_x$ should not influence or impair the optical transmission signal, which may happen—as explained above—when the power level of the optical control signal is changed. Therefore the light source $\lambda_x$ generates the optical control signal C having a fixed optical power level. In order to adjust the optical power of the optical control signal C an adjustable period and an adjustable pulse width of the optical control signal C are used. The mean optical power results form the fixed optical power level, the period and the pulse width. The control means 3 controls the light source $\lambda_x$ in response to the detected variations of the optical power of the optical transmission signal OS and adjusts either the period or the pulse width of the optical control signal C to generate a optical control signal C with the optical power necessary. It is also possible that both the period and the pulse width are adjusted by the control means 3.

Figure 3:
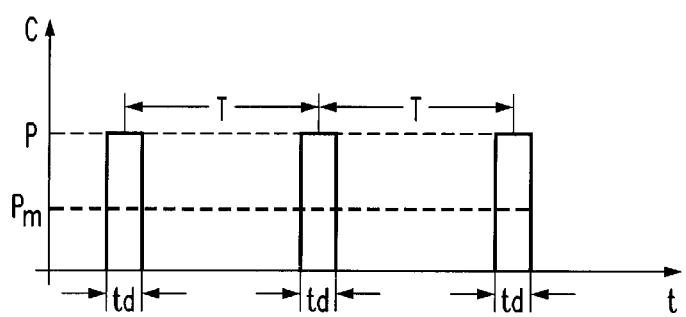
FIG. 3 is a diagram of the optical power of an optical control signal as generated according to FIG. 2.

FIG. 3 depicts a time diagram of the optical power of the output C of the light source $\lambda_x$. The light emitted by the light source $\lambda_x$ has the fixed power level P, a period T and a pulse width td. It can be seen, that the mean optical power $P_m$ with the fixed power level P, the period T and the pulse width td results in $$P_m = \frac{P \cdot td}{T}. \tag{1}$$

For proper operation a variation of the period T in order to compensate for the variations in the optical power of the optical transmission signal OS has shown to be of advantage, because the spectrum of the light emitted by the light source $\lambda_x$, e.g. a laser, mainly depends on the pulse width td as the power level of the optical control signal C in this invention is kept at the fixed power level P. The duration of the period T has to be chosen as short as not to influence the transmission characteristic of optical amplifier 4 used in the transmission system. For common lasers used as light source $\lambda_x$ the period T may have a duration of 0.05–2 $\mu$s, to avoid thermal effects within the laser. The pulse width td is influenced mainly by the modulation bandwidth of the laser used. For common lasers (2.5 Gbit/s) the pulse width td typically lies in the range of 1ns. With the above cited values for the period T and the pulse width td a variation of the optical power of the output C of about 20 dB is possible.

Figure 2:
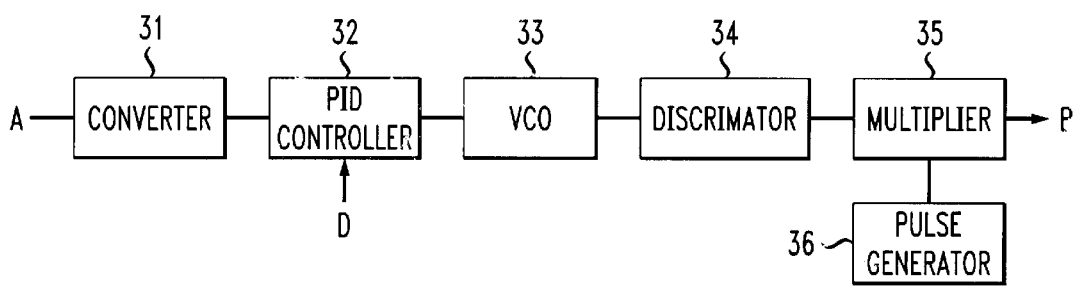
FIG. 2 is a schematic representation of a first embodiment of an apparatus for controlling the optical power of an optical transmission signal according to this invention.

FIG. 2 depicts a schematic representation of a first embodiment of a control means 3 as shown in FIG. 1. The control means 3 comprises an opto-electrical converter 31, e.g. a photo diode, a PID-controller 32, having an input D for a reference voltage, a voltage controlled oscillator (VCO) 33, a discriminator 34, a multiplier 35 and a pulse generator 36. At point A a part of the energy of the optical transmission signal OS is coupled into the photo diode 31 which converts the optical transmission signal OS to an electrical signal which is fed into the PID-controller 32. The converted electrical signal is compared to the reference voltage at input D. The resulting voltage of the PID-controller 32 in turn is fed into the VCO 33 which generates a signal having a frequency depending on the input from the PID-controller 32 having the period T described above. The signal of the VCO 33 is fed to the discriminator 34 which form discrete pulses. The discrete pulses from the discriminator 34 and the signal from the pulse generator 36, having the above mentioned pulse width td, are fed to the multiplier 35 which forms a electrical control signal B for controlling the light source $\lambda_x$.

The optical power of the output C of the light source $\lambda_x$ also can be varied by keeping the period T constant and varying the pulse width td. The reciprocal of the pulse width td has to lie between the relaxation frequency and the frequency at which thermal effects influence the laser forming the light source $\lambda_x$ (10 MHz –3 GHz). Within this frequency range the current/frequency transfer function of common lasers (2.5 Gbit/s) is flat, therefore the spectrum of the emitted light is not changed if the pulse width is varied.

Starting form the control means 3 as described above and shown in FIG. 2, those skilled in the art will easily deduce a control means 3 having a control signal for the variation of the pulse width td as mentioned above. It is also possible to use a control means 3 having a control signal for the variation of both the pulse width td and the period T.

Figure 4:
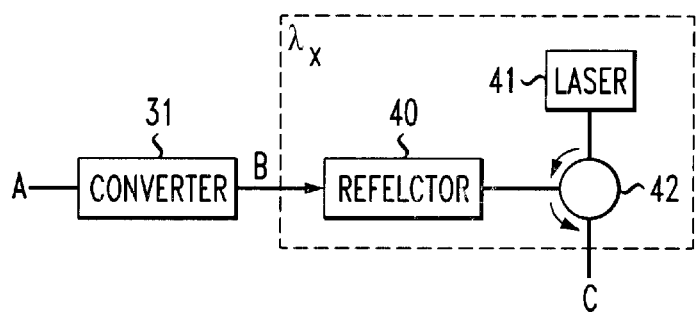
FIG. 4 is a schematic representation of a second embodiment of an apparatus for controlling the optical power of an optical transmission signal according to this invention.

FIG. 4 depicts a schematic representation of a second embodiment control means 3 as shown in FIG. 1 and another embodiment of a light source $\lambda_x$. The control means 3 may be build in a way similar to the control means 3 as shown in FIG. 2 and described above. Its control signal B is fed to the light source $\lambda_x$ which comprises an optical circulator 42 having a first second and third port. To the first port of the optical circulator 42 a laser 41 is coupled, working in a continuous wave mode, having the fixed power level P as described above. To the second port of the optical circulator 42 a controllable reflector 40 is coupled, e.g. a reflection modulator, which is controlled by the control signal B. The third port C of the optical circulator 42 couples the optical control signal into the system as described above.

Figure 5:
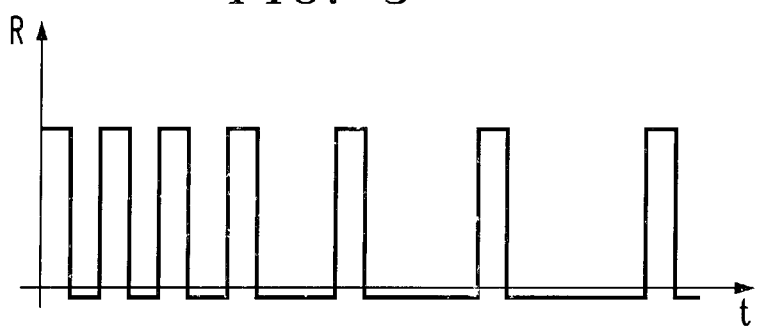
FIG. 5 is a diagram of a first mode of the reflectivity of an reflection modulator as used in FIG. 4.
Figure 6:
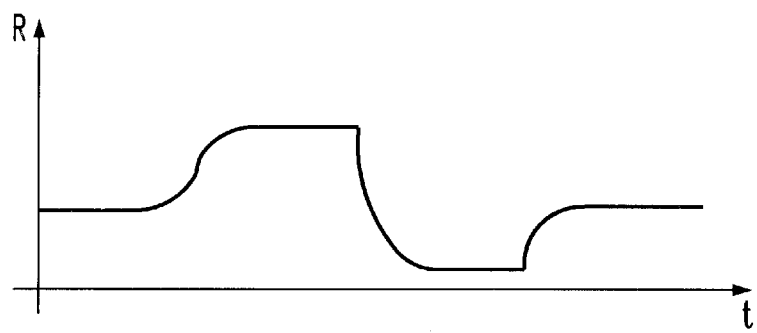
FIG. 6 is a diagram of a second mode of the reflectivity of an reflection modulator as used in FIG. 4.

The reflectivity of the refection modulator 40 varies with the applied control signal B, which may be a current or a voltage. FIG. 5 shows the reflectivity of the reflection modulator 40, if only a minimum and a maximum reflectivity are used. FIG. 6. shows the reflectivity of the reflection modulator 40, if the reflectivity is changed continuously between the minimum and maximum reflectivity.

In case the reflectivity reaches its maximum, the optical signal generated by laser 41 forms the optical control signal at the third port C. In case the reflectivity reaches its minimum the signal generated by laser 41 is not coupled to the third port C. The optical control signal then has zero power.

The advantage of the generation of the control signal as described above is the fact, that the laser 41 operates in the continuous wave mode. The power level of the laser therefore don't has to be varied, thereby avoiding a variation of the wavelength of the emitted light.

As mentioned above the control means 3 may have control signals for the variation of the pulse width td or the variation of the period T or for a combination of the both.

If, as depicted in FIG. 1, an add and drop multiplexer 6 is present in the transmission path, where optical signals or channels could be added or removed form the optical transmission signal, an additional apparatus as described herein may be used to control the optical power of the optical transmission signal. The elements and the function of the additional apparatus are identical to the elements described above. The elements are represented in dashed lines and the denotations are identical to the denotations used above, besides having an apostrophe. A part A' of the optical transmission signal OS' is coupled out with a coupler 8, coupled to a control means 3', which is coupled to a light source $\lambda'_x$, which in turn is coupled to an optical wavelength division multiplexer 7. Instead of adding the optical control signal C' with multiplexer 7 an add input of the add and drop multiplexer 6 could be used.

What is claimed is:

1. A method for controlling the optical power of an optical transmission signal in a wavelength division multiplex system, comprising
    adding an optical control signal having a variable optical power to compensate for variations in the optical power of the optical transmission signal, CHARACTERISED IN THAT,
    the optical control signal has a fixed optical power level, an adjustable period and/or an adjustable pulse width, and
    said period and/or said pulse width of the optical control signal are adjusted to compensate for variations in the optical power of the optical transmission signal.

2. A method according to claim 1, CHARACTERISED IN THAT
    the optical control signal with said period and said pulse width is generated by switching between said fixed optical power level and zero.

3. A method according to claim 1, CHARACTERISED IN THAT
    the optical control signal is generated from a continuous optical signal having said fixed optical power level by attenuating the continuous optical signal.

4. A method according to claim 3, CHARACTERISED IN THAT,
    said attenuation is switched between a maximum and minimum attenuation.

5. A method according to claim 3, CHARACTERISED IN THAT,
    said attenuation is altered continuously between a minimum and maximum attenuation.

6. An apparatus for controlling the optical power of an optical transmission signal (OS;OS') in a wavelength division multiplex system, having a light source means ($\lambda_x;\lambda'_x$) for generating an optical control signal (C;C') having a variable optical power, a control means (2,3;8,3') for detecting variations in the optical power of the optical transmission signal (OS;OS') and controlling in response the optical power of the light source means ($\lambda_x;\lambda'_x$), and an adding means (1;7) for adding the optical control signal (C;C') to the optical transmission signal (OS;OS'), CHARACTERISED IN THAT,
    the light source means ($\lambda_x;\lambda'_x$) generates the optical control signal (C;C') having a fixed optical power level, an adjustable period and/or an adjustable pulse width; and
    the control means (3;3') adjusts said period and/or said pulse width of the optical control signal (C;C') ) in response to the detected variations.

7. An apparatus according to claim 6, CHARACTERISED IN THAT,
    the control means (3;3') controls the light source means ($\lambda_x;\lambda'_x$) to generate the optical control signal (C;C') having said period and said pulse width by switching the light source means ($\lambda_x;\lambda'_x$) between said fixed optical power level and zero.

8. An apparatus according to claim 6, CHARACTERISED IN THAT,
    a laser means (41) generates a continuous optical signal having said fixed optical power level of the optical control signal, and
    the control means (3) controls an attenuation means (40) to generate the optical control signal (C) having said period and said pulse width by attenuating said optical signal.

9. An apparatus according to claim 8, CHARACTERISED IN THAT,
    said attenuation means (40) is switched between a maximum and minimum attenuation.

10. An apparatus according to claim 8, CHARACTERISED IN THAT,
    said attenuation means (40) is altered continuously between a minimum and maximum attenuation.

11. An apparatus according to one of the claims 8 to 10, CHARACTERISED IN THAT,
    said attenuation means (40) is being formed by a reflection modulator.

12. An apparatus according to claim 6, CHARACTERISED IN THAT,
    the optical control signal with said period and said pulse width is generated by switching between said fixed optical power level and zero.

13. An apparatus according to claim 12, CHARACTERISED IN THAT,
    the control means controls the light source means to generate the optical control signal having said period and said pulse width by switching the light source means between said fixed optical power level and zero.

* * * * *